(12) United States Patent
Domer et al.

(10) Patent No.: US 10,213,787 B2
(45) Date of Patent: Feb. 26, 2019

(54) DUAL WEDGE CLAMP ANGLES BLADE CUTTER SYSTEM

(71) Applicant: Graco Minnesota Inc., Minneapolis, MN (US)

(72) Inventors: Todd A. Domer, Norton, OH (US); Paul M. Jones, Youngstown, OH (US); Jonathan R. McMichael, Canton, OH (US); Daniel J. Chase, Wadsworth, OH (US)

(73) Assignee: Graco Minnesota Inc., Minneapolis, MN (US)

( * ) Notice: Subject to any disclaimer, the term of this patent is extended or adjusted under 35 U.S.C. 154(b) by 640 days.

(21) Appl. No.: 14/654,707

(22) PCT Filed: Jan. 31, 2014

(86) PCT No.: PCT/US2014/014157
§ 371 (c)(1),
(2) Date: Jun. 22, 2015

(87) PCT Pub. No.: WO2014/121075
PCT Pub. Date: Aug. 7, 2014

(65) Prior Publication Data
US 2015/0306604 A1 Oct. 29, 2015

Related U.S. Application Data

(60) Provisional application No. 61/759,043, filed on Jan. 31, 2013.

(51) Int. Cl.
*B02C 18/18* (2006.01)
*B26D 1/40* (2006.01)
(Continued)

(52) U.S. Cl.
CPC ............ *B02C 18/18* (2013.01); *B05B 7/0408* (2013.01); *B05B 7/1422* (2013.01); *B26D 1/365* (2013.01);
(Continued)

(58) Field of Classification Search
CPC ..... B02C 18/18; B05B 7/0408; B05B 7/1422; B26D 1/365; B26D 1/40; B26D 1/62;
(Continued)

(56) References Cited

U.S. PATENT DOCUMENTS 3,155,320 A * 11/1964 Jones .................... B05B 7/1495
225/97
3,672,017 A * 6/1972 Nielsen ................. B23C 5/2265
407/49

(Continued)

FOREIGN PATENT DOCUMENTS

| CN | 102666041 A | 9/2012 |
|---|---|---|
| JP | 11268144 A | 10/1999 |
| WO | 2014121075 A1 | 8/2014 |

OTHER PUBLICATIONS

Chinese First Office Action, for Chinese Application No. 201480006739.1, dated May 12, 2016, 16 pages.
(Continued)

*Primary Examiner* — Shelley Self
*Assistant Examiner* — Smith O Bapthelus
(74) *Attorney, Agent, or Firm* — Kinney & Lange, P.A.

(57) ABSTRACT

A cutter head assembly for a fiber roving chopper includes a cylindrical blade cartridge extending axially between a cartridge first end and a cartridge second end. The cylindrical blade cartridge includes a first surface that extends between the cartridge first and second ends and is angled with respect to a central axis of the cylindrical blade cartridge. A second surface extends between the cartridge first and second ends parallel to the first surface and the second surface faces the first surface. A blade body extends between the cartridge first end and the cartridge second end and is disposed between the first surface and the second surface.

19 Claims, 10 Drawing Sheets

(51) Int. Cl.
*B26D 1/62* (2006.01)
*B29B 7/90* (2006.01)
*B05B 7/04* (2006.01)
*B05B 7/14* (2006.01)
*B29B 7/74* (2006.01)
*B29B 7/88* (2006.01)
*B26D 1/36* (2006.01)

(52) U.S. Cl.
CPC ............... B26D 1/40 (2013.01); B26D 1/62 (2013.01); B29B 7/7447 (2013.01); B29B 7/7452 (2013.01); B29B 7/885 (2013.01); B29B 7/90 (2013.01)

(58) Field of Classification Search
CPC ..... B29B 7/7447; B29B 7/7452; B29B 7/885; B29B 7/90; B27G 13/00; B27G 13/002; B27G 13/05; B27G 13/007
USPC ................... 241/294, 293; 30/300, 180, 128, 30/451–462; 144/218–241
See application file for complete search history.

(56) References Cited

U.S. PATENT DOCUMENTS

| | | | | |
|---|---|---|---|---|
| 3,890,706 A | | 6/1975 | Johnson | |
| 3,992,967 A | * | 11/1976 | Fram | C03B 37/16 30/128 |
| 4,001,935 A | * | 1/1977 | Krohn | B05B 7/1495 30/128 |
| 4,063,479 A | * | 12/1977 | Roncato | B26D 7/1836 83/117 |
| 4,406,196 A | * | 9/1983 | Roncato | B26D 7/1818 83/117 |
| 5,027,594 A | | 7/1991 | Gamberoni et al. | |
| 5,092,207 A | * | 3/1992 | Kikuchi | D01G 1/04 83/116 |
| 5,142,957 A | * | 9/1992 | Gallimore | B26D 7/1818 83/117 |
| 5,153,642 A | * | 10/1992 | Folkins | G03G 15/0887 118/245 |
| 5,312,005 A | * | 5/1994 | Odell | F16B 12/30 211/189 |
| 5,456,300 A | * | 10/1995 | Rosenkranz | B27G 13/04 144/174 |
| 5,468,293 A | * | 11/1995 | Jones | B05B 7/1495 118/300 |
| 5,555,786 A | * | 9/1996 | Fuller | B23Q 3/1546 493/362 |
| 5,662,436 A | * | 9/1997 | Bishop | B23C 5/2269 407/35 |
| 6,892,617 B1 | * | 5/2005 | Knauder | B29C 70/305 83/348 |
| 2011/0012449 A1 | * | 1/2011 | Hazeyama | H02K 9/06 310/64 |
| 2012/0222317 A1 | | 9/2012 | Rohrer et al. | |

OTHER PUBLICATIONS

The International Search Report dated May 14, 2014 for International Application No. PCT/US2014/014157.

* cited by examiner

DUAL WEDGE CLAMP ANGLES BLADE CUTTER SYSTEM

CROSS-REFERENCE TO RELATED APPLICATION(S)

This application claims the benefit of U.S. Provisional Application No. 61/759,043 filed Jan. 31, 2013 for "PAINT HOPPDUEL WEDGE CLAMP ANGLED BLADE CUTTER YSTEM WITH MAGNETIC LOAD ASSIST" by Todd A. Domer, Paul M. Jones, Jonathan R. McMichael and Daniel J. Chase and PCT Application No. PCT/US14/14157 filed Jan. 31, 2014 for "DUAL WEDGE CLAMP ANGLED BLADE CUTTER SYSTEM" by Todd A. Domer, Paul M. Jones, Jonathan R. McMichael and Daniel J. Chase.

BACKGROUND

The present invention relates generally to a chopper device that distributes fiber material into a stream of resin material dispensed from a spray gun. More particularly, the present invention relates to a blade assembly used in the chopper device.

Chopper guns are frequently used in the composite material industry to form large, shaped products, such as in the marine and watercraft industries and pool and spa industries. Chopper guns include assemblies of a fiber chopper and a liquid spray gun. Compressed air is typically supplied to an external pump with a pumping mechanism and to an air motor in the fiber chopper. The pumping mechanism typically delivers a liquid resin material and a liquid catalyst material to the spray gun. Actuation of a trigger on the gun dispenses the materials into a mix chamber before being sprayed out of a nozzle of the gun. Mixing of the catalyst with the resin begins a solidification process, which eventually leads to a hard, rigid material being formed upon complete curing of the materials. The fiber chopper is typically mounted on top of the spray gun. The fiber chopper receives rovings of a fiber material, such as fiberglass, which passes between an idler wheel, an anvil and a cutter blade head. The fiber rovings are cut into small segments between the anvil and cutter blade head while being propelled out of the chopper by rotation of the anvil and the cutter blade head. The segments of fiber are mixed into the sprayed mixture of resin and catalyst such that the final cured product is fiber reinforced.

The blade head and anvil of the fiber chopper include consumable pieces that must be replaced after a threshold wear level is surpassed. For example, the blade head typically includes a plurality of razor blades inserted into slots on a blade wheel. Also, the anvil includes a roller of soft material into which blades of the cutter blade head penetrate while slicing or chopping the fiber roving. Thus, it is necessary to frequently disassemble the fiber chopper to access the cutter blade head and anvil, after which further disassembly of those components is also needed. In particular, it is necessary to remove the anvil roller and each blade of the cutter blade head. Prior art blade heads have involved using a blade bar and a wave spring that retains each razor blade within a slot of the blade wheel. This technique is tedious and labor intensive and provides higher risk to operators because handling of each blade is required when removing old blades and inserting new blades into the blade wheel.

There is, therefore, a need for a simpler system and method for retaining razor blades in a cutter blade head for a fiber roving chopper.

SUMMARY

The present disclosure is directed to a cutter head assembly for a fiber roving chopper. The cutter head assembly includes a cylindrical blade cartridge that extends axially between a cartridge first end and a cartridge second end. The cylindrical blade cartridge includes a first surface that extends between the cartridge first and second ends and is angled with respect to a central axis of the cylindrical blade cartridge. A second surface extends between the cartridge first and second ends parallel to the first surface and the second surface faces the first surface. A blade body extends between the cartridge first end and the cartridge second end and is disposed between the first surface and the second surface.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This application claims priority to U.S. provisional application Ser. No. 61/759,043 filed Jan. 31, 2013 by inventors Todd Domer, Paul Jones, Jonathan McMichael, and Daniel Chase, the contents of which are incorporated by this reference.

Figure 1:
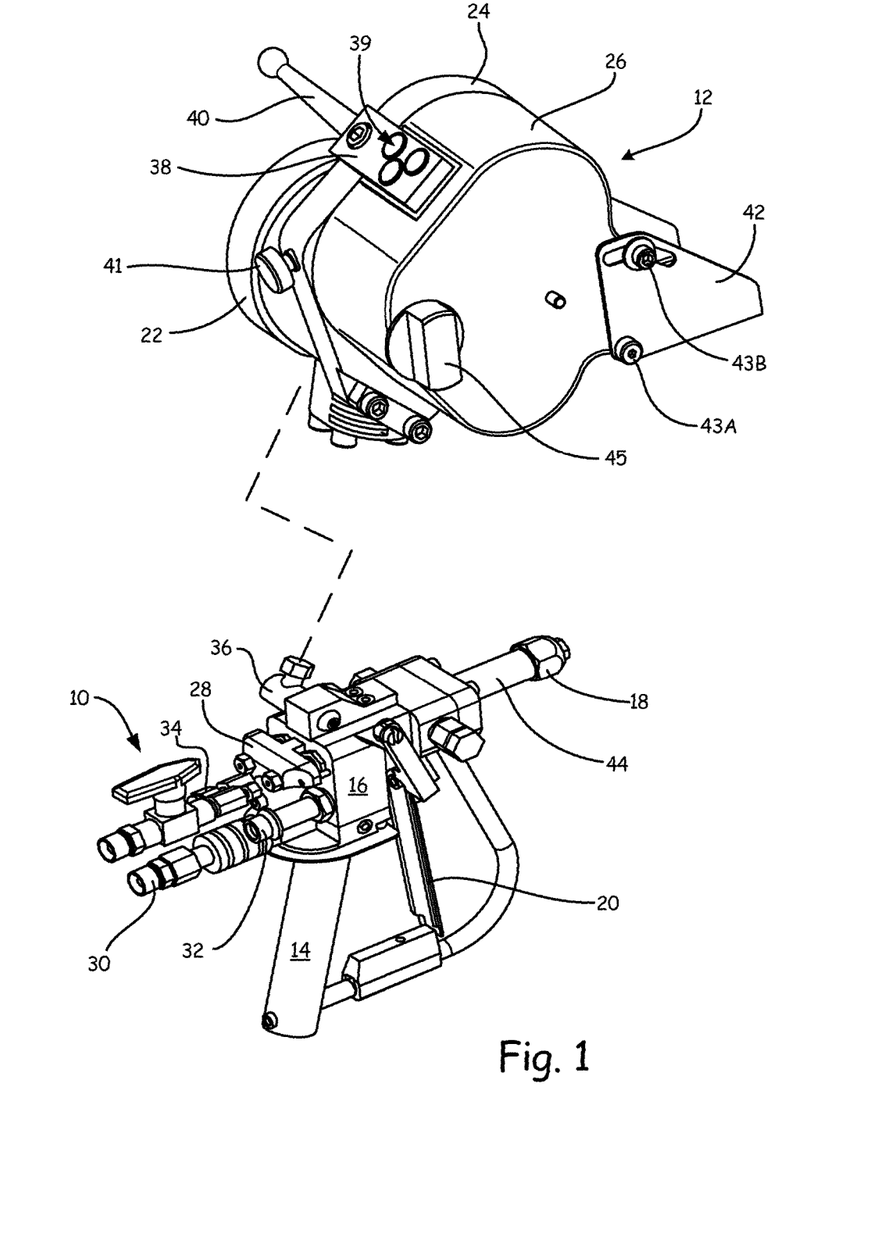
FIG. 1 is an exploded perspective view of a liquid spray gun and a fiber roving chopper assembly in which a cutter head assembly of the present invention is used.

FIG. 1 is an exploded view of an assembly of liquid spray gun 10 and fiber roving chopper 12 in which a cutter head assembly of the present invention is used. In FIG. 1, fiber roving chopper 12 is shown slightly enlarged with respect to liquid spray gun 10. Liquid spray gun 10 comprises a two component internal mixing gun having handle 14, valve body 16, nozzle 18 and trigger 20. Fiber roving chopper 12 includes air motor 22, housing 24 and cover 26. Valve body 16 of spray gun 10 includes valve assembly 28, air inlet 30, material inlet 32, catalyst inlet 34 and air outlet 36. Housing 24 of fiber roving chopper 12 includes fiber inlet 38, openings 39, lever 40, knob 41, fasteners 43A and 43B, knob 45, and cover 26 includes dispenser chute 42.

In the embodiment shown, spray gun 10 comprises a two component mixing gun that receives two liquid components that mix when dispensed to produce a mixture that cures into a hardened material. A first component comprises a resin material, such as a polyester resin or a vinyl ester, and is fed into valve body 16 at material inlet 32. A second component comprises a catalyst material that causes the resin material to harden, such as Methyl Ethyl Ketone Peroxide (MEKP), and is fed into valve body 16 at catalyst inlet 34. Material inlet 32 and catalyst inlet 34 feed materials, respectively, into valves seated within valve body 16 and connected to valve assembly 28. Other inlets are provided to gun 10 for other fluids such as a solvent. Actuation of trigger 20 simultaneously causes valves of valve assembly 28 to open and causes pressurized components to flow into nozzle 18. As shown, spray gun 10 comprises an internal mixer where the two components are pressurized at inlets 32 and 34 by an external source (not shown) and mixed within tube 44 before entering nozzle 18. Pressurized air may also be provided to nozzle 18 to shape or direct the mixed flow stream. In other embodiments, the materials are mixed outside of gun 10 after being pressurized within valve body 16 with air from inlet 30 and atomized by a mixing nozzle.

Pressurized air from air inlet 30 is also fed through valve body 16 to outlet 36, which connects to an inlet (not shown) on air motor 22 of fiber chopper 12. Rovings or strands of a fiber material, such as fiberglass, are fed into cover 26 through openings 39 in fiber inlet 38. Activation of air motor 22 by actuation of trigger 20 causes the rovings to be pulled into a cutter head assembly by an anvil and idler wheel mounted on housing 24, as will be discussed in greater detail with respect to FIG. 2C. Positions of the anvil and idler wheel are adjusted with respect to the cutter head assembly using lever 40 and knob 41. The chopped roving pieces are expelled from dispenser chute 42 into the mixed stream of resin and catalyst materials from nozzle 18 such that the hardened material includes fiber reinforcements that increase strength of the final product.

It is frequently necessary to remove cover 26 from housing 24 of chopper 12 to perform routine maintenance after spray gun 10 and fiber chopper 12 are operated. Specifically, blades of the cutter head assembly and a cutting surface of the anvil must be replaced, as the blades become dull from cutting the rovings and the cutting surface becomes lacerated by the blades. The cutter head assembly of the present invention is quickly and easily removed from chopper 12 once cover 26 is removed. Furthermore, blades can be easily and safely replaced in the cutter head assembly of the present invention.

Figure 2A:
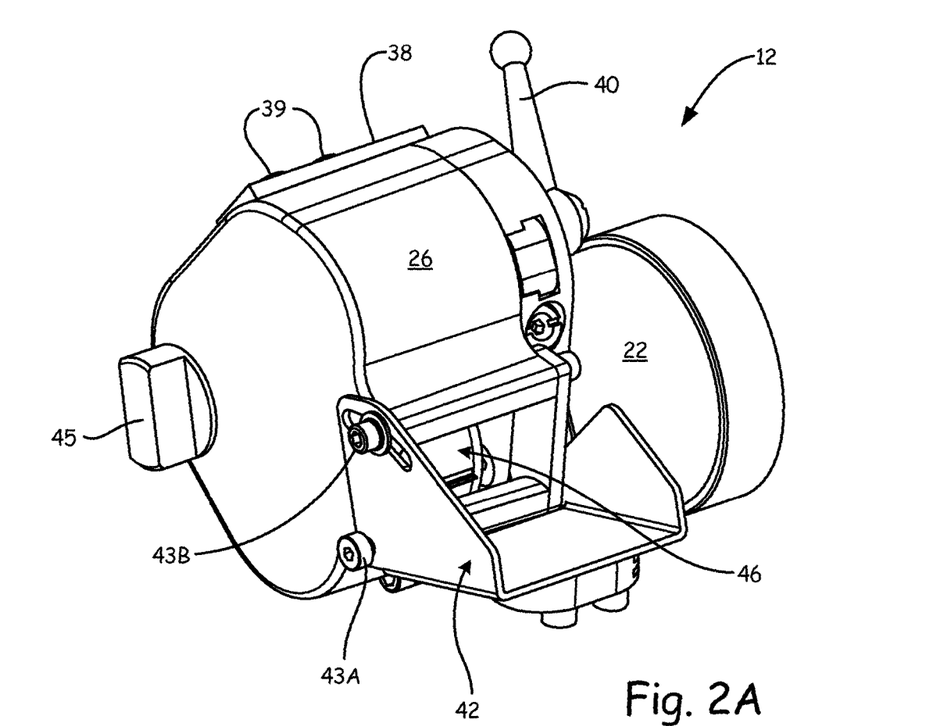
FIG. 2A is a perspective view of the fiber roving chopper of FIG. 1 showing a cutter head assembly.
Figure 2B:
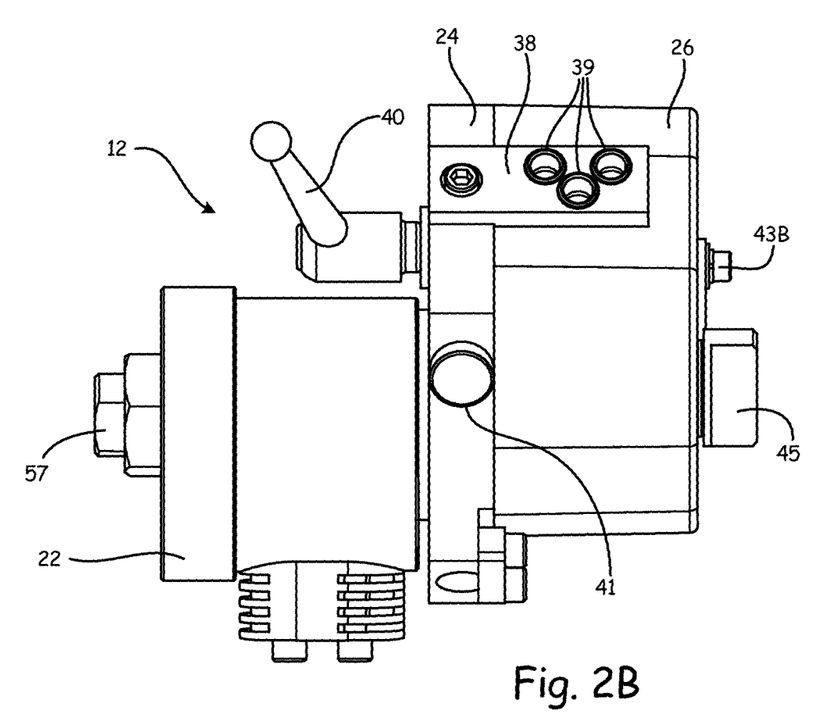
FIG. 2B is a rear end view of the fiber roving chopper of FIG. 1 showing fiber roving inlet holes.
Figure 2C:
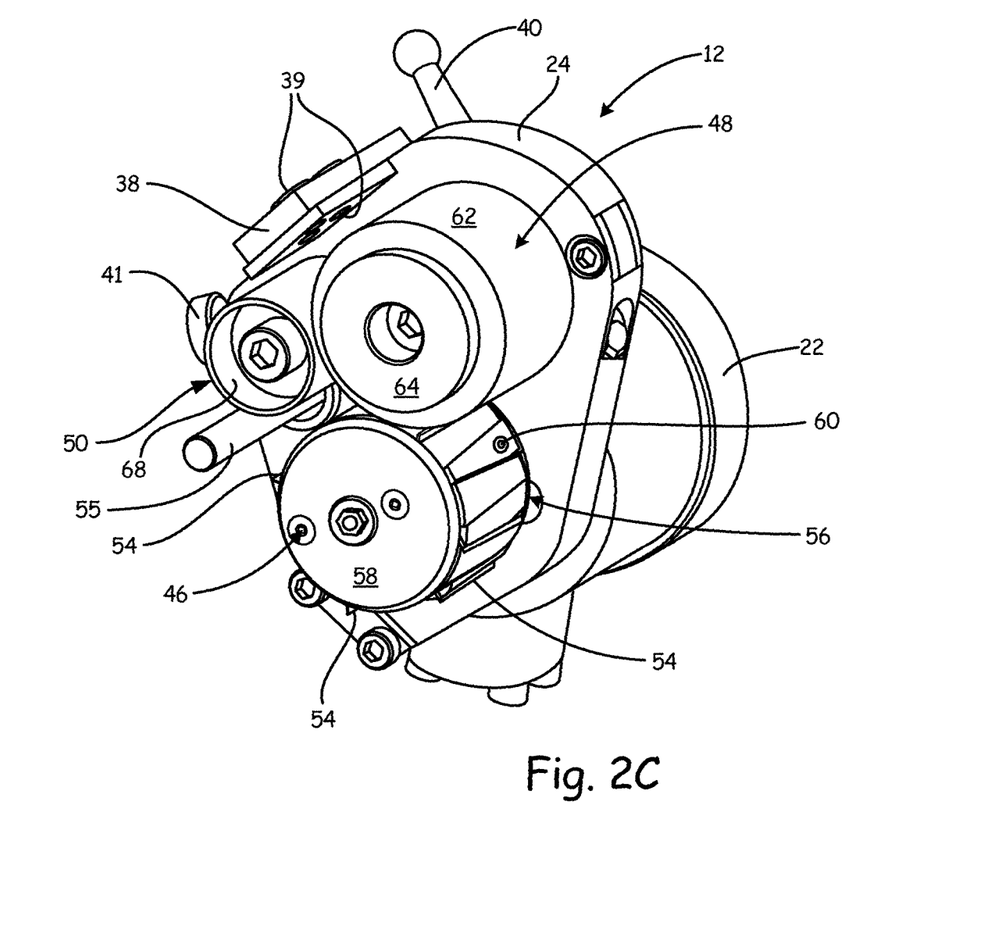
FIG. 2C is a perspective view of the fiber roving chopper of FIG. 1 with a cover removed to show a cutter head assembly, an anvil, and an idler wheel.

FIG. 2A is a perspective view of fiber roving chopper 12 of FIG. 1 showing an embodiment of cutter head assembly 46. FIG. 2B is a top view of fiber roving chopper 12 of FIG. 1 showing fiber roving inlet holes 39. FIG. 2C is a perspective view of fiber roving chopper 12 of FIG. 1 with cover 26 removed to show cutter head assembly 46, anvil 48 and idler wheel 50. FIGS. 2A-2C are discussed concurrently, with specific emphasis on FIG. 2C. Fiber chopper 12 also includes air motor 22, housing 24, fiber inlet 38, openings 39, lever 40, knob 41, dispenser chute 42, fasteners 43A and 43B, knob 45, and tube 55. Cutter head assembly 46 includes blades 54, blade cartridge 56, first cap 58, and fasteners 60. Anvil 48 includes roller 62, and retention cap 64. Idler wheel 50 includes roller 68.

Cover 26 comprises a multi-sided body having an opening that mates with housing 24 to conceal cutter head assembly 46, anvil 48 and idler wheel 50. Cover 26 includes an opening to allow chopped rovings from cutter head assembly 46 to be thrown from chopper 12. Dispenser chute 42 mounts to cover 26 with fasteners 43A and 43B near the opening to receive chopped rovings from cutter head assembly 46. Dispenser chute 42 comprises a three-sided angled plate along which chopped rovings pass after being cut by chopper head assembly 46. The angle of dispenser chute 42 on fasteners 43A can be adjusted using fasteners 43B to change the trajectory of the chopped roving pieces. Knob 45 extends into cover 26 to engage tube 55 (FIG. 2C) and retain cover 26 in engagement with housing 24.

With reference to FIG. 2C, cutter head assembly 46, anvil 48 and idler wheel 50 are mounted for rotation on housing 24. Specifically, cutter head assembly 46 is mounted directly onto a drive shaft extending from shaft support 57 (FIG. 2B) of air motor 22, through housing 24, and into blade cartridge 56. Lever 40 is used to adjust the position of anvil 48 and idler wheel 50 with respect to cutter head assembly 46 and to push anvil 48 into contact with cutter head assembly 46. The position of idler wheel 50 with respect to anvil 48 is adjusted using knob 41. Adjustment of knob 41 allows for rovings of different thicknesses to be fed between anvil 48 and idler wheel 50. Adjustment of lever 40 controls engagement of cutter head assembly 46 with anvil 48, thereby controlling feeding of rovings into fiber inlet 38.

Air motor 22 rotates cutter head assembly 46 by rotation of the drive shaft that extends substantially coaxially with shaft support 57 of air motor 22. Engagement of blades 54 with roller 62 of anvil 48 causes anvil 48 to rotate as well. Anvil 48 drives rotation of idler wheel 50 through engagement with roller 68 of idler wheel 50. Rovings fed into fiber inlet 38 are grabbed by anvil 48 and idler wheel 50 and pushed between anvil 48 and cutter head assembly 46. Blades 54 of cutter head assembly 46 are pushed into roller 62, which comprises a deformable material. The rovings are sliced between blades 54 and roller 62 as blades 54 rotate anvil 48 and cut into roller 62. Blades 54 are spaced at even intervals on blade cartridge 56 so that the fibers are consistently cut into similarly sized lengths. Blades 54 and roller 62 become worn and eventually need to be replaced to prevent unacceptable performance degradation of fiber chopper 12. Roller 68 is slid off its mounting shaft and removed from housing 24 to perform maintenance. Retention cap 64 is removed to allow roller 62 to be replaced. Anvil 48 is slid off its mounting shaft to perform maintenance. Fasteners 60 are removed from blade cartridge 56 to allow cutter head assembly 46 to slide off of the drive shaft of air motor 22.

Figure 3A:
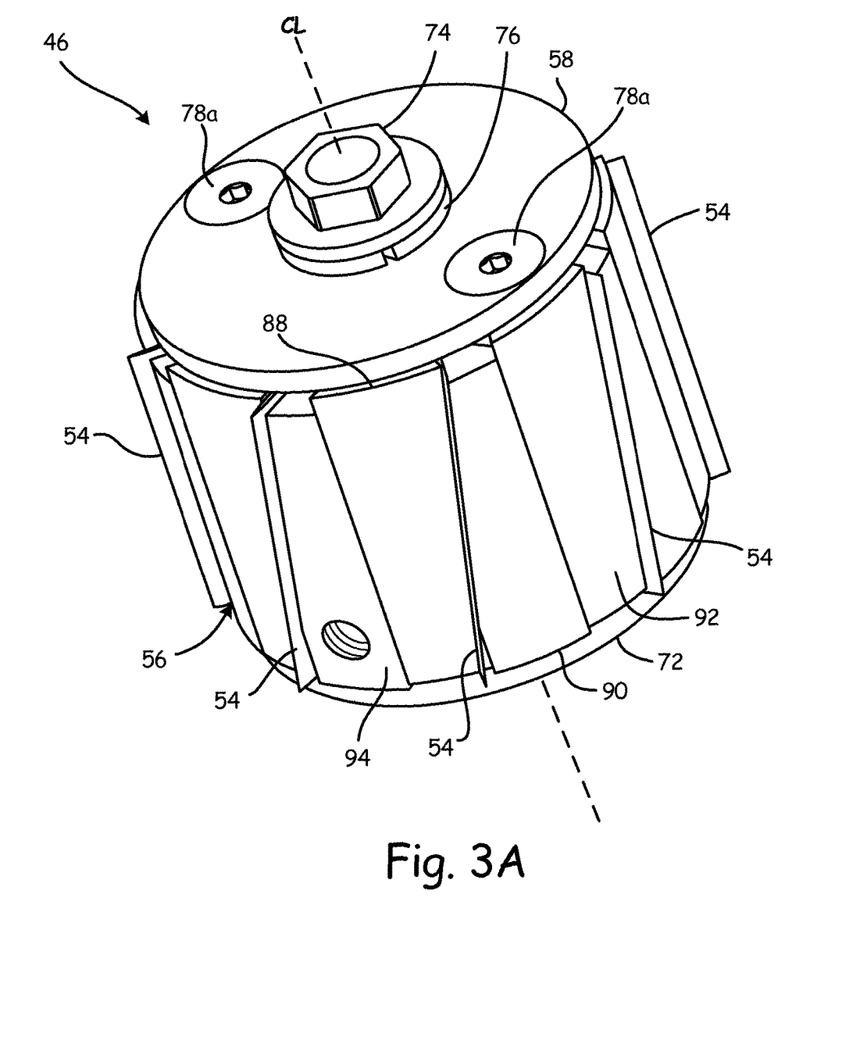
FIG. 3A is a perspective top view of the cutter head assembly of FIG. 2C.
Figure 3B:
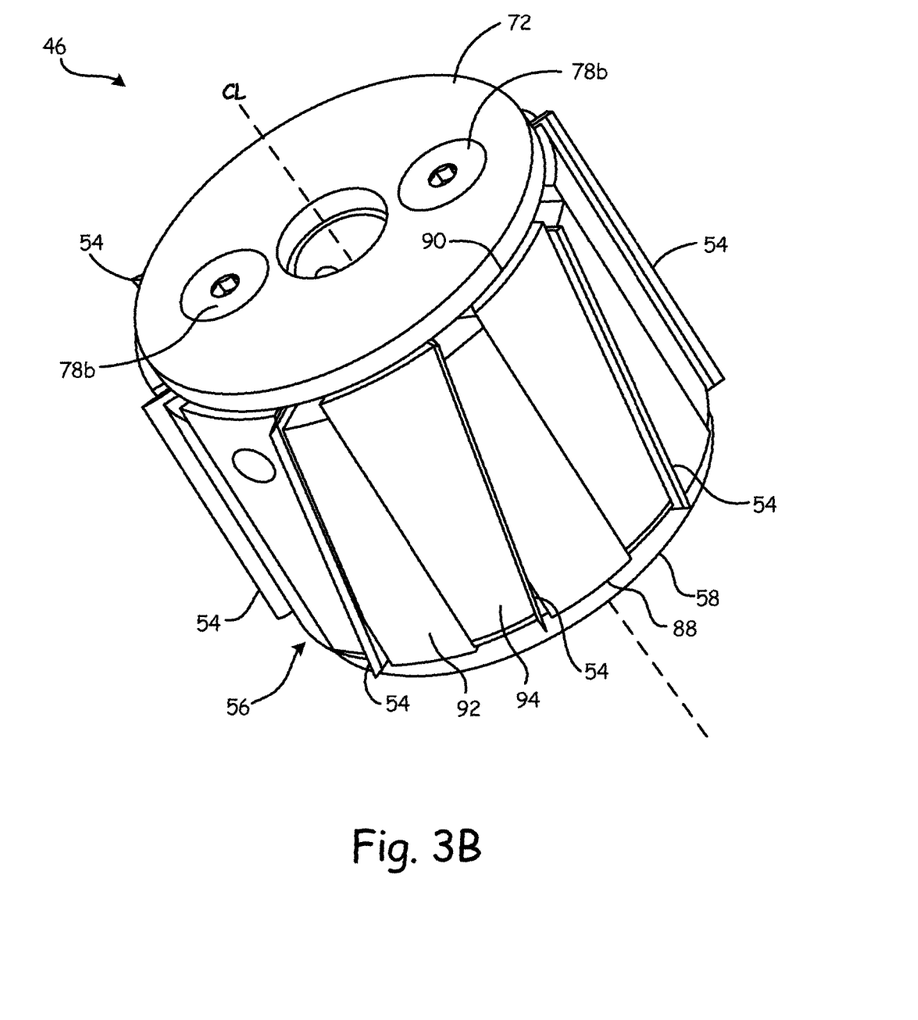
FIG. 3B is a perspective bottom view of the cutter head assembly of FIG. 3A.

FIGS. 3A-3B are now discussed concurrently. FIG. 3A is a perspective top view of cutter head assembly 46 of FIG. 2C, and FIG. 3B is a perspective bottom view of cutter head assembly 46 of FIG. 3A. As shown in FIGS. 3A-3B, cutter head assembly 46 can further include, in addition to the elements previously described in the discussion of FIG. 2C, second cap 72, bolt 74, washer 76, screws 78a, and screws 78b. Blade cartridge 56 can include cartridge first end 88, cartridge second end 90, central axis CL, first body 92, and second body 94.

First body 92 and second body 94 can be configured to mate with one another to form blade cartridge 56. When first body 92 and second body 94 are assembled together, as shown in FIGS. 3A and 3B, blade cartridge 56 can be generally cylindrical and can extend axially along central axis CL between cartridge first end 88 and cartridge second end 90. First body 92 and second body 94 can be configured to hold blades 54 such that blades 54 are angled with respect to central axis CL of blade cartridge 56. Angling blades 54 on blade cartridge 56 decreases the starting torque experienced by air motor 22 at startup of fiber roving chopper 12 and also increases the working life of blades 54, thereby reducing the frequency in which cutter head assembly 46 must be disassembled to replace blades 54.

First cap 58 can be disposed against blade cartridge 56 at cartridge first end 88. Bolt 74 can connect first body 92 between second body 94 and first cap 58. Washer 76 can be disposed between bolt 74 and first cap 58. Screws 78a can also connect first cap 58 to first body 92 of blade cartridge 56 at cartridge first end 88. Second cap 72 can be disposed against blade cartridge 56 at cartridge second end 90. Screws 78b can connect second cap 72 to second body 94 of blade cartridge 56 at cartridge second end 90. First body 92 and second body 94 of blade cartridge 56, first cap 58, and second cap 72 can all comprise aluminum material or any other suitable material. Cutter head assembly 46 and blade cartridge 56 are discussed in greater detail below with reference to FIGS. 3C and 3D.

Figure 3C:
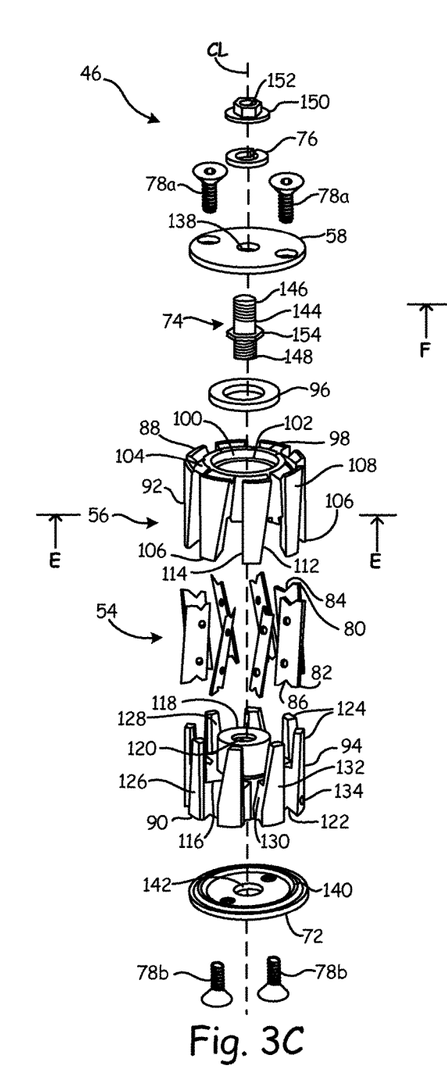
FIG. 3C is an exploded top view of the cutter head assembly of FIG. 3A.
Figure 3D:
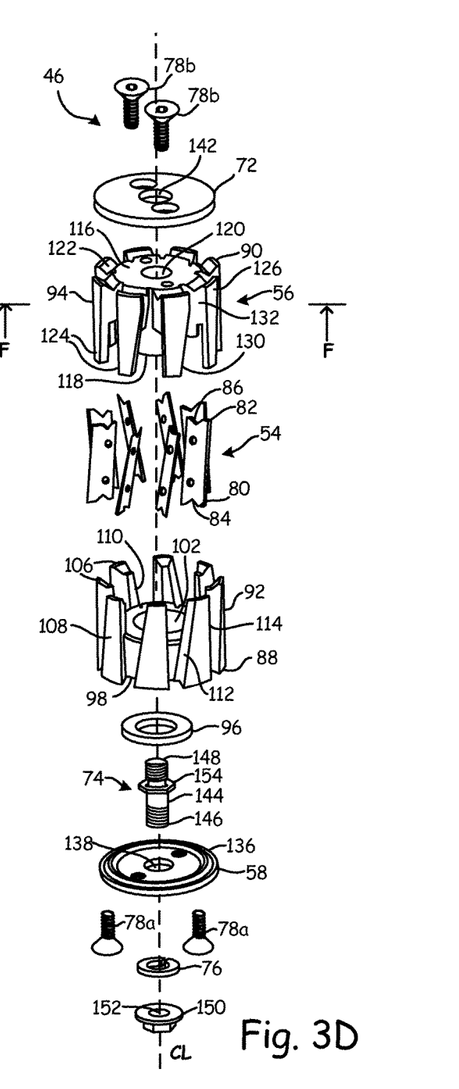
FIG. 3D is an exploded bottom view of the cutter head assembly of FIG. 3B.

FIGS. 3C and 3D are exploded views of cutter head assembly 46, FIG. 3C showing an exploded top view of cutter head assembly 46 and FIG. 3D showing an exploded bottom view of cutter head assembly 46. As shown in FIGS. 3C and 3D, each of blades 54 can include blade first end 80, blade second 82, first notch 84, and second notch 86. Blade cartridge 56 can further include, in addition to the elements previously described in the discussion of FIGS. 3A and 3B, magnet 96. First body 92 of blade cartridge 56 can include first base 98, recess 100, bore 102, first annular groove 104, and first plurality of fingers 106. Each finger 106 in the first plurality of fingers 106 can include first outer surface 108, first inner surface 110, first surface 112, and first side surface 114. Second body of blade cartridge 94 can include second base 116, extended portion 118 with bore 120, second annular groove 122, and second plurality of fingers 124. Each one of the second plurality of fingers 124 can include second outer surface 126, second inner surface 128, second surface 130, and second side surface 132. Fastener hole 134 can be formed in at least one of the second plurality of fingers 124. First cap 58 can include first annular protrusion 136 and hole 138. Second cap 72 can include second annular protrusion 140 and hole 142. Bolt 74 can include cylindrical bolt body 144, first threaded end 146, second threaded end 148, bolt head 150 with center hole 152, and flange 154.

First base 98 of first body 92 can at least partially form cartridge first end 88. As shown in FIG. 3C, first annular groove 104 can be formed on first base 98 of first body 92 at cartridge first end 88. First annular groove 104 can have a V-shaped geometry extending into first base 98 of first body 92. Recess 100 can be formed in first base 98 of first body 92 at cartridge first end 88 and can extend in the axial direction at least partially through a center of first base 98 of first body 92. Recess 100 can be circular and sized to receive and house magnet 96. Bore 102 can extend completely through a center of first base 98 and can be smaller in diameter than recess 100 and concentric with recess 100.

As shown in FIGS. 3C and 3D, the first plurality of fingers 106 can extend from first base 98 towards cartridge second end 90. The first plurality of fingers 106 can also be circumferentially spaced apart from one another around first base 98. First outer surface 108 of each of the first plurality of fingers 106 can extend generally in an axial direction between cartridge first end 88 and cartridge second end 90. First inner surface 110 of each of the first plurality of fingers 106 can extend generally in an axial direction between cartridge first end 88 and cartridge second end 90. First inner surface 110 of each one of the plurality of first fingers 106 can be disposed radially inward from first outer surface 108 relative central axis CL of blade cartridge 56. First side surface 114 can extend axially between cartridge first end 88 and cartridge second end 90 parallel to central axis CL and can also extend between first outer surface 108 and first inner surface 110 of each of the plurality of first fingers 106.

First surface 112 can extend between first outer surface 108 and first inner surface 110 and can also extend between cartridge first end 88 and cartridge second end 90. First outer surface 108 and first inner surface 110 can circumferentially space first surface 112 from first side surface 114. First surface 112 can be angled with respect to central axis CL of blade cartridge 56. In the embodiment of FIGS. 3C and 3D, first surface 112 can be angled relative to central axis CL such that first surface 112 diverges away from central axis CL and first side surface 114 as first surface 112 extends axially towards cartridge second end 90 from cartridge first end 88. Second body 94 of blade cartridge 56 is discussed in detail below.

Second base 116 of second body 94 can at least partially form cartridge second end 90. As shown in FIG. 3D, second annular groove 122 can be formed on second base 116 of second body 94 at cartridge second end 90. Second annular groove 122 can have a V-shaped geometry extending into second base 116 of second body 94. Extended portion 118 can extend axially from a center of second base 116 and can be generally cylindrical and smaller in diameter than second base 116. Extended portion 118 can be sized just smaller than bore 102 of first body 92 such that bore 102 can receive extended portion 118 when second body 94 and first body 92 are assembled together. A second bore, bore 120, can extend axially through a center of extended portion 118 and second base 116. Bore 120 can be threaded in at least a portion of its axial extent and sized to receive second threaded end 148 of bolt 74.

As shown in FIGS. 3C and 3D, the second plurality of fingers 124 can extend from second base 116 towards cartridge first end 88. The second plurality of fingers 124 can also be circumferentially spaced apart from one another around second base 116. Second outer surface 126 of each of the second plurality of fingers 124 can extend generally in an axial direction between cartridge second end 90 and cartridge first end 88. Second inner surface 128 of each of the second plurality of fingers 124 can extend generally in an axial direction between cartridge second end 90 and cartridge first end 88. Second inner surface 128 of each one of the plurality of second fingers 124 can be disposed radially inward from second outer surface 126 relative central axis CL of blade cartridge 56. Second side surface 132 can extend axially between cartridge second end 90 and cartridge first end 88 parallel to central axis CL and can also extend between second outer surface 126 and second inner surface 128 of each of the plurality of second fingers 124.

Second surface 130 can extend between second outer surface 126 and second inner surface 128 and can also extend axially between cartridge first end 88 and cartridge second end 90. Second outer surface 126 and second inner surface 128 can circumferentially space second surface 132 from second side surface 132. Second surface 130 can be angled with respect to central axis CL of blade cartridge 56. Second surface 130 can be angled such that second surface is generally parallel to first surface 112 of the first plurality of fingers 106 of first body 92. In the embodiment of FIGS. 3C and 3D, second surface 130 can be angled relative to central axis CL such that second surface 130 diverges from central axis CL and second side surface 132 as second surface 130 extends from cartridge second end 90 towards cartridge first end 88.

When blade cartridge 56 is assembled, second body 94 can mate with first body 92 such that extended portion 118 of second body 94 is received by bore 102 of first body 92 and each one of the second plurality of fingers 124 can extend generally in an axial direction between two of the first plurality of fingers 106 such that second surface 130 of each of the second plurality of fingers 124 faces and opposes one first surface 112 of the first plurality of fingers 106. A gap can exist between first surface 112 and second surface 130 large enough to receive one of blades 54. Blades 54 are discussed in more detail below.

Each of blades 54 can be disposed between one first surface 112 of the first plurality of fingers 106 and one second surface 130 of the second plurality of fingers 124 and can extend between cartridge first end 88 and cartridge second end 90. A body of each blade 54 can be disposed between first surface 112 and second surface 130 and a cutting edge of each blade can extend beyond first outer surface 108 of first body 92 and second outer surface 126 of second body 94. Because each first surface 112 and each second surface 130 are angled with respect to central axis CL of blade cartridge 56, each of blades 54 is held at an angle with respect to central axis CL by first body 92 and second body 94. Angling blades 54 on blade cartridge 56 decreases the starting torque experienced by air motor 22 at startup of fiber roving chopper 12 and also increases the working life of blades 54, thereby reducing the frequency in which cutter head assembly 46 must be disassembled to replace blades 54.

First notch 84 can be disposed on blade first end 80 of each of blades 54. As shown in FIGS. 3C and 3D, first notch 84 can include a geometry that corresponds with the geometry of first annular groove 104 of first body 92 such that first notch 84 of each blade 54 aligns with first annular groove 104 when each blade 54 is properly positioned between one first surface 112 and one second surface 130. Similarly, second notch 86 can be disposed on blade second end 82 of each of blades 54. As shown in FIGS. 3C and 3D, second notch 86 can include a geometry that corresponds with the geometry of second annular groove 122 of second body 94 such that second notch 86 of each blade 54 aligns with second annular groove 122 when each blade 54 is properly positioned between one first surface 112 and one second surface 130. As shown in FIGS. 3C and 3D, first notch 84 and second notch 86 can both have V-shaped geometries. The function of first notch 84 and second notch 86 is discussed below in the description of first cap 58 and second cap 72.

As previously discussed, first cap 58 can be disposed against cartridge first end 88 of blade cartridge 56 and can include hole 138 and first annular protrusion 136. Hole 138 can extend through a center of first cap 58 and can be sized to receive bolt body 144 of bolt 74. As shown in FIG. 3D, first annular protrusion 136 can be formed on first cap 58 and can extend generally in an axial direction toward cartridge first end 88 of blade cartridge 56. First annular protrusion 136 can include a geometry that corresponds with first notch 84 and first annular groove 104 such that first annular protrusion 136 is at least partially received by first notch 84 and first annular groove 104 when first cap 58 is assembled to the rest of blade cartridge 56. As shown in FIGS. 3C and 3D, first annular protrusion 136, first notch 84, and first annular groove 104 can have matching V-shaped geometries.

Second cap 72 can be disposed against cartridge second end 90 of blade cartridge 56 and can include hole 142 and second annular protrusion 140. Hole 142 can extend through a center of second cap 72 and can be sized to receive the drive shaft extending from shaft support 57 (FIG. 2B) of air motor 22. As shown in FIG. 3C, second annular protrusion 140 can be formed on second cap 72 and can extend generally in an axial direction toward cartridge second end 90 of blade cartridge 56 and opposite to first annular protrusion 136. Second annular protrusion 140 can include a geometry that corresponds with second notch 86 and second annular groove 122 such that second annular protrusion 140 is at least partially received by second notch 86 and second annular groove 122 when second cap 72 is assembled to the rest of blade cartridge 56. As shown in FIGS. 3C and 3D, second annular protrusion 140, second notch 86, and second annular groove 122 can have matching V-shaped geometries.

As shown in FIG. 3C, magnet 96 can include an annular geometry and can be disposed in recess 100 of first body 92 such that each of blades 54 can be disposed radially outward relative magnet 96. Magnet 96 assists in maintaining the position of blades 54 on first surfaces 112 by creating a radial inward force the pulls blades 54 towards a center of first body 92. The force generated by magnet 96 also decreases the likelihood that blades 54 will fall off of first body 92 under the influence of gravity as first body 92 and second body 94 are assembled together. Magnet 96 can be a neodymium magnet ($Nd_2Fe_{14}B$), or any other relatively strong magnet, to ensure that magnet 96 is sufficiently strong to maintain the position of blades 54 on first surfaces 112 as cutter head assembly 46 is assembled or reassembled. First cap 58 can cover recess 100 and magnet 96 so as to protect magnet 96 from damage and to prevent magnet 96 from falling out of recess 100 during operation of fiber rover chopper 12. As discussed below, bolt 74 can connect first cap 58 to blade cartridge 56.

As shown in FIG. 3C, bolt body 144 and bolt head 150 of bolt 74 can be two separate components. Bolt body 144 can be generally cylindrical and first threaded end 146 of bolt body 144 can be threaded in a first direction, such as a left-handed thread. Second threaded end 148 of bolt body 144 can be threaded in a second direction opposite the first direction, such as a right-handed thread. Center hole 152 of bolt head 150 can be threaded in the first direction, the same direction as the first threaded end 146 of bolt body 144, and sized for receiving first threaded end 146. Flange 154 can extend radially outward from bolt body 144 between first threaded end 146 and second threaded end 148.

During the assembling of cutter head assembly 46, second threaded end 148 is inserted into the threaded portion of bore 120 of second body 94 and turned in the second direction until second threaded end 148 of bolt body 144 is secured to second body 94. Threaded bore 120 of second body 94 of blade cartridge 56 can be threaded in the second direction so that threaded bore 120 is adapted to receive second threaded end 148 of bolt body 144. As shown in FIG. 3C, flange 154 can have a hexagonal circumference such that an operator can use a wrench or any other appropriate tool against flange 154 to rotate bolt body 144. With second threaded end 148 of bolt body 144 secured in threaded bore 120 of second body 94, bolt body 144 extends in a general direction across recess 100 of first body 92 and through the annular geometry of magnet 96. First cap 58 can be placed over cartridge first end 88 such that first threaded end 146 of bolt body 144 extends through hole 138 of first cap 58. Washer 76 can be placed on first threaded end 146 over first cap 58 and bolt head 150 can be turned in the first direction onto first threaded end 146 such that bolt head 150 is secured to first threaded end 146 of bolt body 144 with washer 76 and first cap 58 disposed between bolt head 150 and flange 154. Assembled, bolt 74 connects first body 92 between second body 94 and first cap 58. When cutter head assembly 46 needs to be disassembled to replace blades 54, an operator can turn bolt head 150 in the first direction. Because bolt head 150 is threaded in the first direction, bolt head 150 and first threaded end 146 of bolt body 144 continue to tighten together while the threaded connection between second threaded end 148 of bolt body 144 and threaded bore 120 of second body 94 loosens. As second threaded end 148 loosens from and threaded bore 120 and begins to rotate out of threaded bore 120, flange 154 is forced against first cap 58 and presses first cap 58 away from blade cartridge 56. Because flange 154 forces first cap 58 away from blade cartridge 56 during the disassembling of cutter head assembly 46, no extra tools or effort is generally required in prying first cap 58 and blade cartridge 56 apart. FIGS. 3E-3H, discussed briefly below, provide additional views of cutter head assembly 46 and blade cartridge 56 to assist in illustrating the features discussed above with reference to FIGS. 3C and 3D.

Figure 3E:
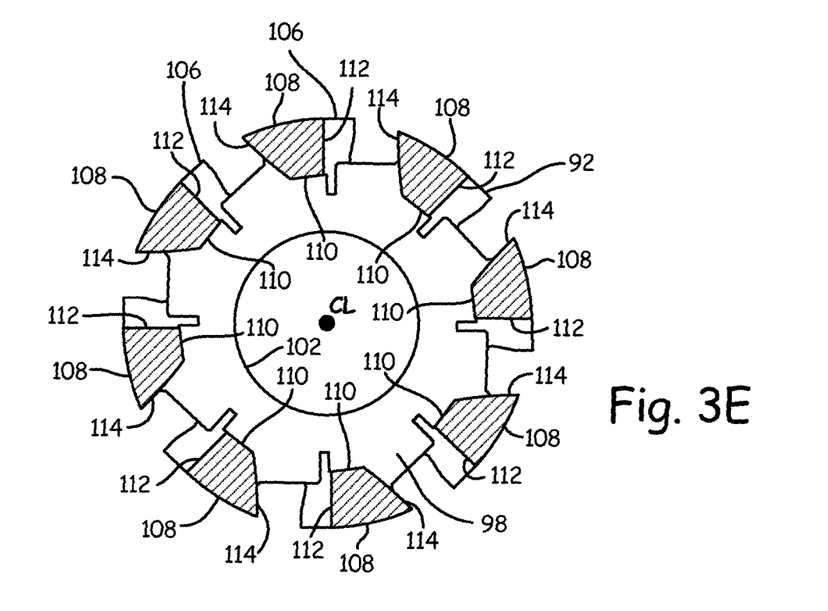
FIG. 3E is a cross-sectional view of a first body of the cutter head assembly taken along line E-E of FIG. 3C.

FIG. 3E provides a cross-sectional view of the first plurality of fingers 106 of first body 92 of blade cartridge 56 taken along line E-E of FIG. 3C. As shown in FIG. 3E, first inner surface 110 of each one of the plurality of first fingers 106 can be disposed radially inward from first outer surface 108 relative central axis CL of blade cartridge 56. First side surface 114 is parallel to central axis CL and can extend between first outer surface 108 and first inner surface 110 of each of the plurality of first fingers 106. First surface 112 can also extend between first outer surface 108 and first inner surface 110. First outer surface 108 and first inner surface 110 can circumferentially space first surface 112 from first side surface 114. As discussed above in detail with reference to FIGS. 3C and 3D, first surface 112 can be angled with respect to central axis CL of blade cartridge 56.

Figure 3F:
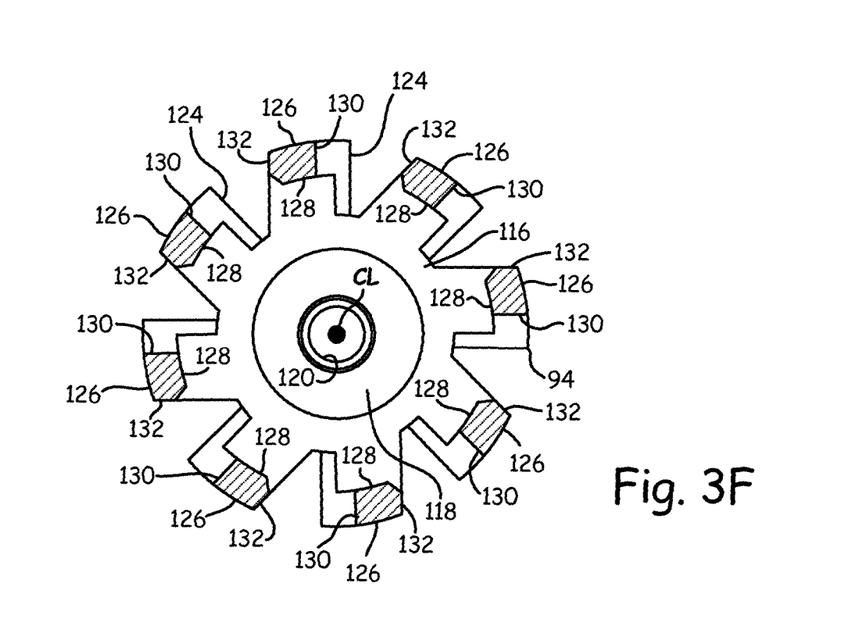
FIG. 3F is a cross-sectional view of a second body of the cutter head assembly taken along line F-F of FIG. 3D.

FIG. 3F provides a cross-sectional view of the second plurality of fingers 124 of second body 94 of blade cartridge 56 taken along line F-F of FIG. 3C. As shown in FIG. 3F, second inner surface 128 of each one of the plurality of second fingers 124 can be disposed radially inward from second outer surface 126 relative central axis CL of blade cartridge 56. Second side surface 132 is parallel to central axis CL and can extend between second outer surface 126 and second inner surface 128 of each of the plurality of second fingers 124. Second surface 130 can also extend between second outer surface 126 and second inner surface 128. Second outer surface 126 and second inner surface 128 can circumferentially space second surface 132 from second side surface 132. Second surface 130 can be angled with respect to central axis CL of blade cartridge 56. Second surface 130 can be angled such that second surface is generally parallel to first surface 112 of the first plurality of fingers 106 of first body 92.

When blade cartridge 56 is assembled, second body 94 can mate with first body 92 such that each one of the second plurality of fingers 124 can extend generally in an axial direction between two of the first plurality of fingers 106 such that second surface 130 of each of the second plurality of fingers 124 faces and opposes one first surface 112 of the first plurality of fingers 106. A gap can exist between first surface 112 and second surface 130 large enough to receive one of blades 54.

Figure 3G:
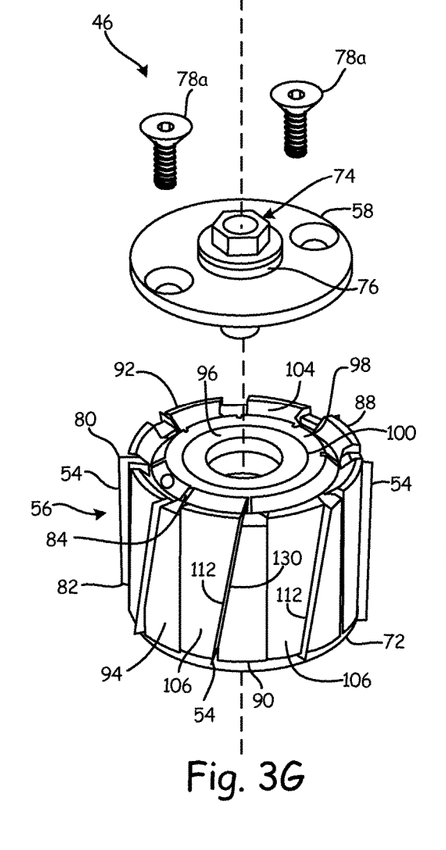
FIG. 3G is a partial exploded view of the cutter head assembly of FIG. 3A.

FIG. 3G is a partial exploded top view of cutter head assembly 46 of FIG. 3A. As previously discussed with reference to FIGS. 3C and 3D and shown in FIG. 3G, first notch 84 of each blade 54 can include a geometry that corresponds with the geometry of first annular groove 104 of first body 92 such that first notch 84 of each blade 54 aligns with first annular groove 104 when each blade 54 is properly positioned between one first surface 112 and one second surface 130.

Figure 3H:
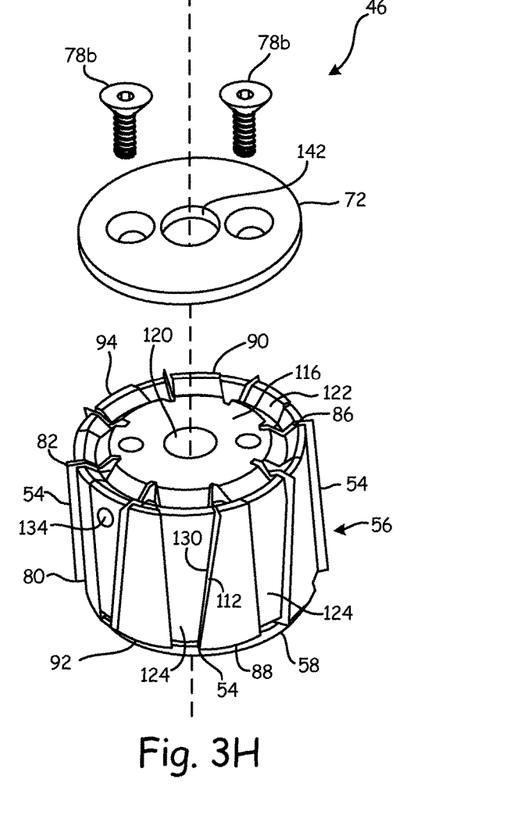
FIG. 3H is a partial exploded view of the cutter head assembly of FIG. 3B.

FIG. 3H is a partial exploded bottom view of cutter head assembly 46 of FIG. 3B. As also previously discussed with reference to FIGS. 3C and 3D and shown in FIG. 3H, second annular groove 122 can be formed on second base 116 of second body 94 at cartridge second end 90. Second notch 86 of each blade 54 can include a geometry that corresponds with the geometry of second annular groove 122 of second body 94 such that second notch 86 of each blade 54 aligns with second annular groove 122 when each blade 54 is properly positioned between one first surface 112 and one second surface 130.

Figure 4:
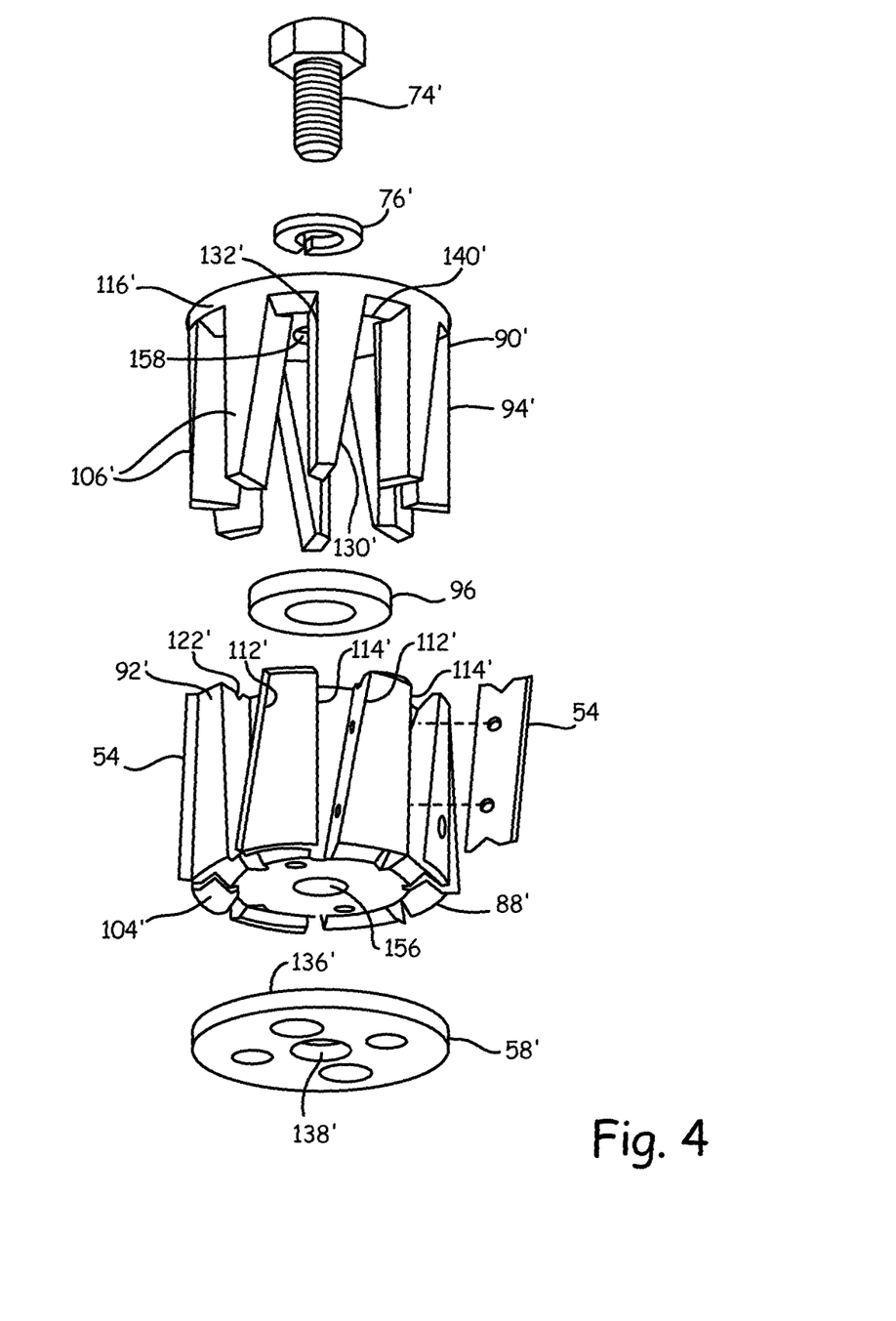
FIG. 4 is an exploded view of another embodiment of a cutter head assembly of the present invention.

Together, first annular protrusion 136 of first cap 58 and second annular protrusion 140 of second cap 72 function as wedges in first annular groove 104, first notch 84, second annular groove 122, and second notch 86 respectively to position each of blades 54 between the corresponding first surface 112 and second surface 130 and to also restrain movement of blades 54. As shown in FIGS. 3C, 3D, 3G, and 3F, the V-shaped geometry of first annular protrusion 136 and second annular protrusion 140 in conjunction with the V-shaped geometry of first notch 84 and second notch 86 would cause any blade 54 that was incorrectly aligned with respect to blade cartridge 56 to shift into its correct position as first cap 58 and second cap 72 are connected to blade cartridge 56. While cutter head assembly 46 has been described with reference to the embodiments disclosed in FIGS. 3A-3H, cutter head assembly 46 is not limited to the previously described embodiments and can include additional embodiments. FIG. 4, described below, provides by way of example another embodiment of cutter head assembly 46.

FIG. 4 is an exploded view of another embodiment of cutter head assembly 46' of the present invention. As shown in FIG. 4, first body 92' can include threaded bore 156, and second body 94' can include hole 158. Threaded bore 156 can extend at least partially through a center of first body 92' of blade cartridge 56'. Hole 158 can extend through a center of second body 94' of blade cartridge 56'. Instead of including second cap 72, second annular protrusion 140' can be formed on second base 116' between each of second plurality of fingers 124'. Magnet 96 can be disposed between second base 116' of second body 94' and first body 92'. Recess 100' (not visible in FIG. 4) can be formed on first body 92' to accommodate magnet 96. Bolt 74' can extend through hole 158 of second body 94', through recess 100' of first body 92', and through the annular geometry of magnet 96' and into threaded bore 156 of first body 92' to connect second body 94' to first body 92'. First cap 58' can be connected to first body 92' by screws or bolts, similar to screws 78*a* described above with reference to FIGS. 3A and 3B.

Persons of ordinary skill in the art will recognize that cutter head assembly 46 of the present invention can provide numerous advantages and benefits. Some examples of those advantages and benefits are as follows. Cutter head assembly provides blades 54, blade cartridge 56 with first surface 112 and second surface 130, and magnet 96. First surface 112 and second surface 130 of blade cartridge 56 hold blades 54 at an angle which increases the life of blades 54 during operation while also decreasing the starting torque of air motor 22 that drives cutter head assembly 46. Magnet 96 assists in preventing blades 54 from falling out of cartridge 56 during assembling and reassembling without requiring the need of springs, thereby simplifying cutter head assembly 46 over prior art cutter head assemblies. In addition, cutter head assembly also provides first annular protrusion 136, second annular protrusion 140, first notch 84, and second notch 86 that assist in correctly positioning blades 54 during the assembling of cutter head assembly 46.

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A cutter head assembly for a fiber roving chopper, the cutter head assembly comprising:
   a cylindrical blade cartridge extending axially between a cartridge first end and a cartridge second end, the cylindrical blade cartridge comprising:
      a first body having a base at the cartridge first end and a finger extending from the base toward the cartridge second end, the finger having a first surface angled with respect to a central axis of the cylindrical blade cartridge; and
      a second body having a second surface that is angled with respect to the central axis, wherein the second body is configured to receive and mate with the finger of the first body such that the second surface opposes the first surface and is parallel to the first surface; and
   a blade extending between the cartridge first end and the cartridge second end and disposed between the first surface of the first body and the second surface of the second body.

2. The cutter head assembly of claim 1, further comprising:
   a magnet disposed on the first body of the cylindrical blade cartridge, wherein the magnet maintains the position of the blade on the first surface.

3. The cutter head assembly of claim 2, further comprising:
   a first cap disposed against the cylindrical blade cartridge at the cartridge first end, the first cap comprising:
      a first annular protrusion extending towards the cylindrical blade cartridge;
   a second cap disposed against the cylindrical blade cartridge at the cartridge second end, the second cap comprising:
      a second annular protrusion extending towards the cylindrical blade cartridge and opposite the first annular protrusion; and
   the blade comprising a first notch disposed on a first end of the blade and a second notch disposed on a second end of the blade, wherein the first notch receives the first annular protrusion and the second notch receives the second annular protrusion so as to position the blade and restrain movement of the blade in a radial direction.

4. The cutter head assembly of claim 3, wherein the magnet comprises an annular geometry and is disposed in a recess extending at least partially through a center of the first body of the cylindrical blade cartridge.

5. The cutter head assembly of claim 4, wherein the magnet is a neodymium magnet.

6. The cutter assembly of claim 4 further comprising:
   a threaded bore extending through a center of the second body of the cylindrical blade cartridge;
   a hole extending through a center of the first cap; and
   a bolt extending through the hole of the first cap, through the recess of the first body, and through the annular geometry of the magnet and into the threaded bore of the second body to connect the first body between the second body and the first cap.

7. The cutter assembly of claim 6, wherein the bolt further comprises:
   a cylindrical bolt body with a first threaded end and a second threaded end, the first threaded end being threaded in a first direction and the second threaded end being threaded in a second direction opposite the first direction;
   a bolt head with a center hole threaded in the first direction and sized for receiving the first threaded end of the bolt body; and
   a flange extending radially outward from the bolt body between the first threaded end and the second threaded end.

8. The cutter assembly of claim 7, wherein the first cap is disposed between the bolt head and the flange, and the threaded bore of the second body of the cylindrical blade cartridge is threaded in the second direction to receive the second threaded end of the bolt body.

9. The cutter assembly of claim 6 further comprising:
   at least one screw connecting the second cap to the second body of the cylindrical blade cartridge at the cartridge second end.

10. The cutter head assembly of claim 9, wherein the first and second bodies of the cylindrical blade cartridge, the first cap, and the second cap comprise aluminum material.

11. A cutter head assembly for a fiber roving chopper, the cutter head assembly comprising:
a cylindrical blade cartridge extending axially between a cartridge first end and a cartridge second end, the cylindrical blade cartridge comprising:
a first body having a first plurality of circumferentially spaced fingers, each of the first plurality of fingers having a first surface angled with respect to a central axis of the cylindrical blade cartridge; and
a second body having a second plurality of circumferentially spaced fingers, each of the second plurality of fingers being disposed between two of the first plurality of fingers and having a second surface angled so as to oppose one of the first surfaces of the first plurality of fingers; and
a plurality of blades extending between the cartridge first end and the cartridge second end, each blade being disposed between one of the first surfaces of the first plurality of fingers and one of the second surfaces of the second plurality of fingers.

12. The cutter head assembly of claim 11, further comprising:
a first cap disposed against the cylindrical blade cartridge at the cartridge first end, the first cap comprising:
a first annular protrusion extending towards the cylindrical blade cartridge;
a first annular groove formed on the cartridge first end, the first annular groove at least partially receiving the first annular protrusion of the first cap; and
a first notch disposed on a first end of each of the plurality of blades,
wherein the first notch at least partially receives the first annular protrusion.

13. The cutter head assembly of claim 12, further comprising:
a second cap disposed against the cylindrical blade cartridge at the cartridge second end, the second cap comprising:
a second annular protrusion extending towards the cylindrical blade cartridge and opposite the first annular protrusion;
a second annular groove formed on the cartridge second end, the second annular groove at least partially receiving the second annular protrusion of the second cap; and
a second notch disposed on the second end of each of the plurality of blades,
wherein the second notch at least partially receives the second annular protrusion.

14. The cutter head assembly of claim 11, wherein each of the first plurality of fingers of the first body further comprises:
an outer surface extending axially between the cartridge first end and the cartridge second end;
an inner surface extending axially between the cartridge first end and the cartridge second end and disposed radially inward from the outer surface relative the central axis of the cylindrical blade cartridge; and
a side surface extending axially between the cartridge first end and the cartridge second end parallel to the central axis and extending between the outer surface and the inner surface,
wherein the first surface extends between the outer surface and the inner surface and extends between the cartridge first end and the cartridge second end, and the outer surface and the inner surface circumferentially space the first surface from the side surface.

15. The cutter head assembly of claim 14, wherein each of the second plurality of fingers of the second body further comprises:
an outer surface extending axially between the cartridge first end and the cartridge second end;
an inner surface extending axially between the cartridge first end and the cartridge second end and disposed radially inward from the outer surface relative the central axis of the cylindrical blade cartridge; and
a side surface extending axially between the cartridge first end and the cartridge second end parallel to the central axis and extending between the outer surface and the inner surface,
wherein the second surface extends between the outer surface and the inner surface and extends axially between the cartridge first end and the cartridge second end, and the outer surface and the inner surface circumferentially space the second surface from the side surface.

16. The cutter assembly of claim 15, wherein the first surface diverges from the central axis as the first surface extends axially towards the cartridge second end from the cartridge first end, and the second surface diverges from the central axis as the second surface extends from the cartridge second end towards the cartridge first end.

17. A cutter head assembly for a fiber roving chopper, the cutter head assembly comprising:
a cylindrical blade cartridge extending axially between a cartridge first end and a cartridge second end, the cylindrical blade cartridge comprising:
a first body comprising a first base at the cartridge first end and a first finger extending from the first base toward the cartridge second end, the first finger having a first surface extending between the cartridge first and second ends and angled with respect to a central axis of the cylindrical blade cartridge; and
a second body comprising a second base at the cartridge second end and a second finger extending from the second base toward the cartridge first end, the second finger having a second surface extending between the cartridge first and second ends parallel to the first surface, wherein the second finger of the second body is configured to mate with the first finger of the first body such that the second surface faces the first surface; and
a blade body extending between the cartridge first end and the cartridge second end and disposed between the first surface and the second surface.

18. The cutter assembly of claim 17 further comprising:
a recess extending at least partially through a center of the first body of the cylindrical blade cartridge;
a magnet with an annular geometry disposed in the recess;
a threaded bore extending at least partially through a center of the first body of the cylindrical blade cartridge;
a hole extending through a center of the second body of the cylindrical blade cartridge; and
a bolt extending through the hole of the second body, through the recess of the first body, and through the annular geometry of the magnet and into the threaded bore of the first body to connect the second body to the first body.

19. The cutter head assembly of claim 18, wherein the blade body is disposed between the first surface and the second surface and radially outward relative the annular magnet.

* * * * *